United States Patent [19]

Jacobsen

[11] 4,035,809
[45] July 12, 1977

[54] ELECTRONIC INTEGRATOR FOR CHART RECORDER

[76] Inventor: John Kenneth Jacobsen, 568 Lillian Drive, Madeira Beach, Fla. 33708

[21] Appl. No.: 643,723

[22] Filed: Dec. 29, 1975

[51] Int. Cl.² .................. G01D 9/28; G01D 9/00; G06G 7/18
[52] U.S. Cl. ................................. 346/62; 346/13; 235/183
[58] Field of Search ............ 346/13, 33 R, 65, 62; 235/183

[56] References Cited

U.S. PATENT DOCUMENTS

| | | | |
|---|---|---|---|
| 2,946,644 | 7/1960 | Henry | 346/13 |
| 2,967,749 | 1/1961 | Strickler | 346/13 X |
| 3,012,838 | 12/1961 | Wagner et al. | 346/62 X |
| 3,183,515 | 5/1965 | Hartman et al. | 346/33 R X |
| 3,531,633 | 9/1970 | Johnson | 346/13 UX |
| 3,742,515 | 6/1973 | Yeiser | 346/13 X |
| 3,749,868 | 7/1973 | Lutz et al. | 346/62 X |
| 3,750,187 | 7/1973 | Keefer | 346/13 X |
| 3,965,477 | 6/1976 | Hambleton et al. | 346/13 |

Primary Examiner—George H. Miller, Jr.

[57] ABSTRACT

An integrator for continually computing the area under a curve drawn by a chart recorder, and displaying the area information by superimposing small spikes on the curve. The integrator uses a voltage-to-frequency converter that derives its input from the signal source to generate the spikes. A frequency divider circuit can be used so that every $n$th spike is larger or negative, making readout easier. The spikes and the analog signal are electronically added and the resulting signal is connected to a standard laboratory pen chart recorder. The area under any selected portion of the chart curve is found by counting the spikes on the curve.

3 Claims, 2 Drawing Figures

ELECTRONIC INTEGRATOR FOR CHART RECORDER

BACKGROUND OF THE INVENTION

It is often necessary to determine the area under a curve or a portion of a curve drawn by a chart recording instrument. An example of such usage is found in gas or liquid chromatography, where the chart recorder shows a series of curves, each representing a component of the sample. The area under each peak is a measure of the quantity present of the coresponding elutent from the chromatograph column.

Several methods can be used to measure the area under the curves including cutting out and weighing the curves drawn on paper or the use of a planimeter. Another method is to use an automatic integrator built into the chart recorder. One such device employs a computing mechanism of the type called a ball and disc integrator. This device is arranged so that it causes an auxiliary pen to trace a zig-zag or triangular wave along the lower edge portion of the chart. The spatial frequency of this wave is proportional to the area under the main curve. Other devices use a voltage to frequency converter to drive an auxiliary pen. The pen traces a zig-zag line similar to the ball and disc integrator. The number of zig-zag lines under the corresponding curve correspond to the area under the curve.

The present invention teaches an improved integrator that can be used with any standard single pen laboratory chart recorder. Unlike previous designs no modification is required to the recorder. The improved integrator has increased ease of readout and lower cost.

BRIEF SUMMARY OF THE INVENTION

This invention is an integrator for chart recorders which electronically superimposes small spikes on the recorder curve. By counting the spikes on the desired portions of the curve the area under the curve can be found.

Since the spikes are superimposed on the signal curve a standard single pen chart recorder can be employed. The spikes are generated by an electrical pulse generator whose output frequency (or repetition rate) is proportional to the electrical input signal to the intergrator. A frequency divider circuit can be employed to make every nth spike larger or negative. Preferably every tenth spike is negative.

The output of the pulse generator, divider and the analog input signal are electronically added, this signal is the output of the integrator. A standard laboratory single pen chart recorder is connected to the integrator output.

DETAILED DESCRIPTION OF THE INVENTION

Figure 1:
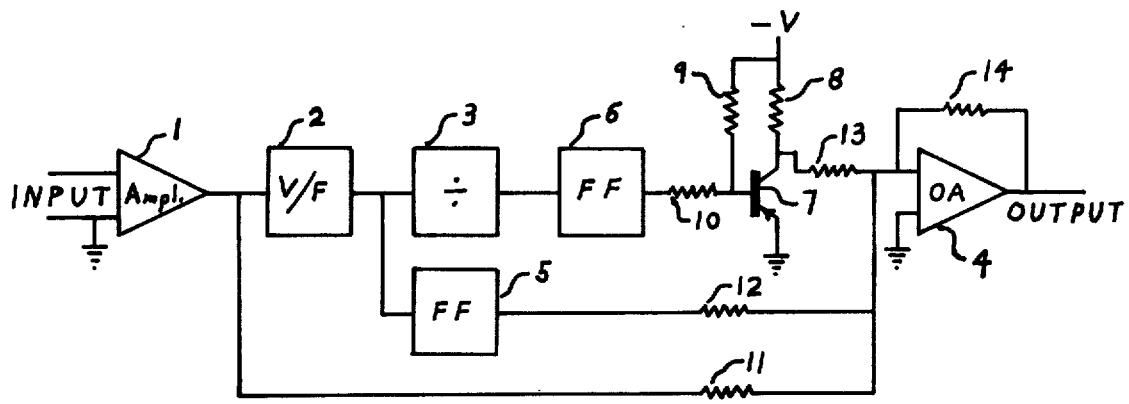
FIG. 1 is a drawing showing the connection of certain electrical elements of the present invention.

FIG. 1 shows diagrammatically an electronic integrator for chart recorders according to the invention. An amplifier 1 raises the signal from the gas or liquid chromatograph up to a satisfactory level. This could be any suitable direct current amplifier. A preferred amplifier would employ an integrated circuit operational amplifier such as the type 741. The output signal from this amplifier at preferably an eight volt level is fed to the input of a voltage to frequency converter 2 and to a summing amplifier 4. The voltage to frequency converter could be any commercially available integrated circuit or discrete device. The maximum frequency rate need only be 20 hertz. A suitable device is the Model 4701 voltage-to-frequency converter made by Teledyne Philbruck Co., Dedham, Mass.

The output of the voltage to frequency converter is fed to a monostable flip-flop 5 and to frequency divider 3. The frequency divider 3 is preferably an integrated circuit decade counter divider such as the CD4017A device manufactured by RCA. The monostable flip-flop 5 generates a pulse of the desired fixed width and amplitude. The monostable flip-flop preferably uses a type 555 integrated timer such as made by Signetics. The monostable flip-flop generates pulses of an amplitude and width that does not vary with frequency. The output from monostable flip-flop 5 goes to summing amplifier 4. The output of decade counter divider 3 goes to monostable flip-flop 6. Monostable flip-flop 6 is the same as monostable flip-flop 5 and generates pulses of the same amplitude and width. The output of monostable flip-flop 6 is connected to the base of a PNP transistor 7. Transistor 7 is preferably 2N4062. The collector of transistor 7 is connected to a negative voltage supply through resistor 8. Transistor 7 is normally biased into conduction by resistor 9. Therefore, the voltage at the junction of transistor 7 and resistor 8 is substantially zero. When a positive pulse from monostable flip-flop 6 is applied to the base of transistor 7 through resistor 10, transistor 7 is turned off and a negative pulse is generated at the junction of transistor 7 and resistor 8. This negative pulse is the same width and substantially the amplitude as the positive pulse from monostable flip-flop 6. This negative pulse is connected to summing amplifier 4 through resistor 13. Summing amplifier 4 is preferably an integrated circuit operational amplifier such as the type 741. The positive input is connected to ground. The negative input is connected to input summing resistors 11, 12, and 13 and to negative feedback resistor 14 that is connected to the amplifier output. This circuit allows summing of the three inputs. The resistance of resistor 13 is one half the resistance of resistor 12. This allows the negative pulse to not only cancel out the positive pulse that arrives at the same time but to generate a negative pulse of the same amplitude as the positive pulse at the summing amplifier 4 output. The amplified signal from amplifier 1 is summed through resistor 11. The pulses (spikes) are superimposed on this signal. The output of summing amplifier 4 is connected to the chart recorder.

Figure 2:
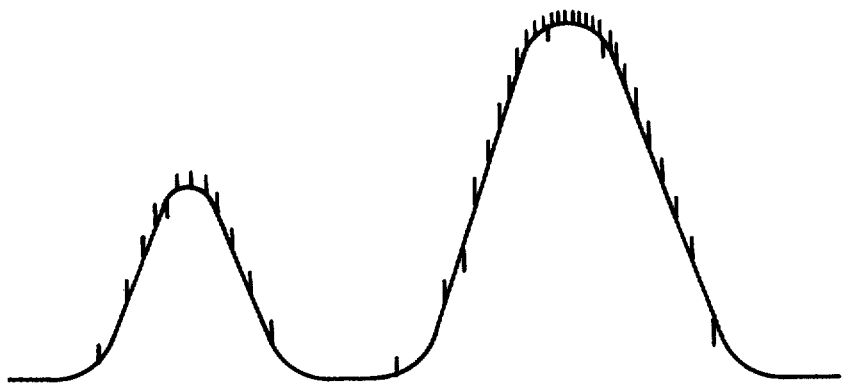
FIG. 2 is a representation of the curve drawn by a chart recorder connected to the present invention showing the superimposed spikes.

FIG. 2 is a representation of the curve drawn by the chart recorder. It illustrates a typical chromatograph curve with the spikes superimposed on it.

What is claimed:

1. An electronic integrator system wherein a series of spikes generated by an electrical pulse generator whose output frequency or repetition rate is proportional to the electrical input signal are electrically added to the same input signal, the resulting combined signal comprising a curve with spikes is displayed ona single pen chart recording instrument and the area under the curve is measured by counting the spikes superimposed on the curve.

2. A system as in claim 1, wherein every n pulse is larger or negative in order to make readout clearer and faster at high count rates.

3. A system as in claim 2, wherein n is every tenth pulse and is negative.